UNITED STATES PATENT OFFICE.

CHARLES DE LA HARPE AND ERNST BODMER, OF BASEL, SWITZERLAND, ASSIGNORS TO THE FIRM OF DYE-WORKS FORMERLY L. DURAND, HUGUENIN & CO., OF BASEL, SWITZERLAND.

RED MORDANT DYESTUFF AND PROCESS OF MAKING SAME.

1,002,825.   Specification of Letters Patent.   Patented Sept. 12, 1911.

No Drawing.   Application filed May 4, 1911. Serial No. 624,945.

*To all whom it may concern:*

Be it known that we, CHARLES DE LA HARPE and ERNST BODMER, both chemists, citizens of the Swiss Republic, and residents of Basel, Switzerland, have invented New Red Mordant Dyestuffs and a Process of Making Same, of which the following is a full, clear, and exact specification.

We have found that new red mordant dyestuffs are obtained by condensing an amino-meta-oxybenzoylbenzoic acid substituted in the amino group with a resorcin sulfonic acid. The condensation is obtained by warming the compounds together in a suitable medium such as sulfuric acid or bisulfate. The most suitable condensing agent is sulfuric acid, of which the concentration may vary within wide limits; an acid of 50 per cent strength, however, is still applicable. In most cases, nevertheless, it is advantageous to use concentrated acid, because prolonged heating with too dilute an acid leads easily to desulfonation. Obviously, it is simplest to sulfonate the resorcin and to add the amino-meta-oxybenzoylbenzoic acid substituted in the amino group to the mass in which the sulfonation is effected, so that the condensation may occur in the same operation. The operations may, however, be separate. This process is applicable to all known mono- and di-alkylated, benzylated, ethylbenzylated or phenylated amino-meta-oxy-benzoylbenzoic acids. The same dyestuffs are obtained whether resorcinmonosulfonic acid or resorcindisulfonic acid are employed, this latter reacting, in a surprising manner, with elimination of a sulfo group. Owing to this fact it is possible to make without difficulty the new dyestuffs at a temperature below 100° C. in nearly quantitative yield free from intermixed non-sulfonated product. The new dyestuffs thus obtained are sulforhodols and dye chrome mordanted fibers clear bluish red to yellowish red tints. They are well marked mordant dyestuffs, whose properties in this respect, however, are due to the ortho positions of a hydroxyl group and of a sulfo group. These new sulforhodols are further characterized by the excellent solubility of their alkali salts in water. As they are of interest for cotton printing, a great advantage accrues from the fact that, in contradiction to the corresponding known non-sulfonated products, they do not dye cotton without a mordant. In washing the printed material, therefore the portions which are not printed remain pure white.

As will be seen from the table hereinafter, the mordant character of the new dyestuffs may be expressed by the difference of their tints on wool with a mordant and without a mordant. The bodies also dye easily cotton chrome-mordanted and printed with a discharge, the discharged places remaining quite white. They also have affinity for a whole series of metallic mordants besides chromium compounds, for instance, iron, aluminium, tin or like compounds. When printed with chrome mordants on cotton some of these dyestuffs produce a red not hitherto attainable with chrome dyestuffs. The fastness to chlorin of the dyeings thus obtained must be designated surprising, for it exceeds that of the ordinary rhodamins. In respect to the general fastness, they are similar to the ordinary rhodamins. The fastness to light of the dyeings on wool is remarkable.

The following examples illustrate the invention:

Example I: Into a solution of 10 kilos of resorcinolmonosulfonic acid in 60 kilos of sulfuric acid of 70 per cent. strength are introduced, while stirring, 14 kilos of dimethylamino-meta-oxybenzoylbenzoic acid corresponding to the formula

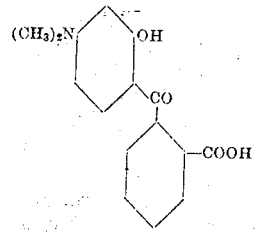

or an equivalent quantity of another amino-meta-oxybenzoylbenzoic acid substituted in the amino group and the mixture is heated to 90° C. until no further increase in the formation of dyestuff can be observed. The cooled mass is poured into ice-water and the dyestuff which separates in flocks is filtered and pressed. By warming with sodium acetate solution the sulfonated dyestuff can be separated from a little non-sulfonated product which is present and a quite small proportion of a basic by-product. From the filtrate from these substances the dyestuff is separated by adding hydrochloric acid; it is filtered, pressed and dried in the usual manner and converted into the alkali salt.

The new dyestuff corresponds probably to the formula

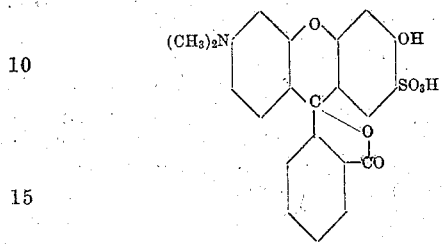

Example II: 14 kilos of resorcinoldisulfonic acid are suspended in 60 kilos of sulfuric acid of 66° Baumé specific gravity and mixed with 14 kilos of dimethylamino-meta-oxybenzoylbenzoic acid, and an equivalent quantity of another amino-meta-oxybenzoyl-benzoic acid substituted in the amino group, while stirring. The mixture is heated to about 90° C. until no further increase of the formation of dyestuff occurs. After cooling, the mass is poured into ice-water and the dyestuff purified and isolated in the manner described in Example I. The same dyestuffs are obtained as are obtained by following Example I.

The new dyestuffs are brown-red to red powders, easily soluble in the form of their alkali salts to red orange or raspberry red solutions from which mineral acids precipitate them as red flocks or as lustrous brown red crystals, appearing green by reflected light. The properties of a number of them appear in the table hereinafter.

| No. | Dyestuff made from— | Color of solution of alkali salt in water. | Color of solution in conc. $H_2SO_4$. | Sulfuric acid solution+$H_2O$. | Dyeing on wool without a mordant. | Dyeing on chromed wool or cotton. |
|---|---|---|---|---|---|---|
| 1. | Dimethylamino-meta-oxybenzoylbenzoic acid+resorcinsulfonic acid. | Scarlet, green fluorescence. | Citron yellow | Rose | Yellowish red | Red. |
| 2. | Di-ethylamino-meta-oxybenzoylbenzoic acid+resorcinsulfonic acid. | Scarlet, somewhat bluer than 1, green fluorescence. | Yellow | Rose | Yellowish red, more vivid than 1. | Red, bluer and more vivid than 1. |
| 3. | Mono-ethylamino-meta-oxybenzoylbenzoic acid+resorcinsulfonic acid. | Red orange, green fluorescence. | Citron yellow | Yellow orange | Orange | Orange red. |
| 4. | Phenylamino-meta-oxybenzoylbenzoic acid+resorcinsulfonic acid. | Raspberry red, green fluorescence. | Brown red | Rose | Magenta red | Magenta red, bluer. |
| 5. | Ethylbenzylamino-meta-oxybenzoylbenzoic acid+resorcinsulfonic acid. | Red orange, green fluorescence. | Yellow | Red orange | Orange | Red orange, redder than 3. |

What we claim is:

1. The described process for the manufacture of red mordant dyestuffs, which consists in condensing an amino-meta-oxybenzoylbenzoic acid substituted in the amino group with a resorcin sulfonic acid.

2. The described process for the manufacture of red mordant dyestuffs, which consists in condensing an alkylamino-metaoxybenzoylbenzoic acid with a resorcinsulfonic acid.

3. The described process for the manufacture of red mordant dyestuffs, consisting in condensing a dialkylamino-metaoxybenzoylbenzoic acid with a resorcinsulfonic acid.

4. As new products the described dyestuffs, resulting from the condensation of a resorcin sulfonic acid with an aminometa-oxybenzoylbenzoic acid substituted in the amino group and constituting in dry state brown-red to red powders easily soluble in water in form of their alkali salts to solutions colored from red orange to raspberry red and showing a green fluorescence, from which they are precipitated by mineral acids, soluble in concentrated sulfuric acid with a citron yellow to a brown red coloration turning to rose or yellow orange on addition of water, and dyeing unmordanted wool and chromed wool or cotton orange to magenta red tints of excellent fastness to chlorin and light.

In witness whereof we have hereunto signed our names this 24th day of April 1911, in the presence of two subscribing witnesses.

CHARLES De la HARPE.
ERNST BODMER.

Witnesses:
 AMAND RITTER,
 ARNOLD ZUBER.